United States Patent
Olliphant et al.

(10) Patent No.: US 8,214,288 B2
(45) Date of Patent: Jul. 3, 2012

(54) SYSTEM AND METHOD OF A PASSPHRASE ACCOUNT IDENTIFIER FOR USE IN A NETWORK ENVIRONMENT

(75) Inventors: Hugo Olliphant, San Francisco, CA (US); George Lee, Mountain View, CA (US); Brian Phillips, San Francisco, CA (US)

(73) Assignee: Ebay Inc., San Jose, CA (US)

( * ) Notice: Subject to any disclaimer, the term of this patent is extended or adjusted under 35 U.S.C. 154(b) by 147 days.

(21) Appl. No.: 11/966,875

(22) Filed: Dec. 28, 2007

(65) Prior Publication Data

US 2009/0171844 A1 Jul. 2, 2009

(51) Int. Cl.
*G06Q 40/00* (2012.01)
(52) U.S. Cl. ............... 705/40; 705/1; 705/14; 705/41; 705/44; 705/64; 235/380
(58) Field of Classification Search ............... 705/1, 14, 705/41, 44, 64; 235/380
See application file for complete search history.

(56) References Cited

U.S. PATENT DOCUMENTS

| 5,822,737 | A | 10/1998 | Ogram |
| 5,963,917 | A | 10/1999 | Ogram |
| 5,991,738 | A | 11/1999 | Ogram |
| 6,839,692 | B2 | 1/2005 | Carrott et al. |
| 7,200,577 | B2 | 4/2007 | Zissimopoulos et al. |
| 2001/0051920 | A1* | 12/2001 | Joao et al. ............... 705/41 |
| 2003/0018587 | A1* | 1/2003 | Althoff et al. ............ 705/64 |
| 2003/0168510 | A1* | 9/2003 | Allen ....................... 235/380 |
| 2003/0208449 | A1 | 11/2003 | Diao |
| 2005/0055317 | A1 | 3/2005 | Carrott et al. |
| 2005/0267800 | A1* | 12/2005 | Tietzen et al. ............ 705/14 |
| 2006/0111978 | A1* | 5/2006 | Tietzen et al. ............ 705/14 |
| 2008/0040274 | A1* | 2/2008 | Uzo ........................... 705/44 |
| 2009/0132273 | A1* | 5/2009 | Boesch ........................ 705/1 |

* cited by examiner

*Primary Examiner* — James Trammell
*Assistant Examiner* — Sanjeev Malhotra
(74) *Attorney, Agent, or Firm* — Haynes and Boone, LLP

(57) ABSTRACT

A system and method for facilitating a financial transaction over a network including use of a passphrase account identifier is described herein. In one embodiment, a system for facilitating a financial transaction over a network comprises a communication interface; and a payment provider system configured to receive via the communication interface a passphrase account identifier from a merchant system, match the passphrase account identifier to a corresponding funding instrument number of a corresponding funding instrument, communicated the corresponding funding instrument number to an issuer system, receive from the issuer system a notification indication of one of acceptance of the funding instrument or decline of the funding instrument, and communicate back to the merchant system the notification indication.

9 Claims, 6 Drawing Sheets

# SYSTEM AND METHOD OF A PASSPHRASE ACCOUNT IDENTIFIER FOR USE IN A NETWORK ENVIRONMENT

BACKGROUND

1. Field of the Invention

The present invention generally relates to financial transactions and more particularly to a passphrase account identifier for use in a financial network.

2. Related Art

In direct (face-to-face) or online financial transactions, customers search for and purchase products and services from a merchant. In the case of online shopping, transactions are conducted through electronic communications with online merchants over electronic networks, such as the Internet. During the course of these transactions, customers may provide payment in various ways including, for example, credit cards, electronic fund transfers, and other payment techniques offered by payment providers.

Typically, when online shopping at a particular website, customers select items to purchase by clicking on a link for a specific item. When done shopping, the customer proceeds to a checkout page to provide some form of payment information such as credit card information for the selected items.

Similarly, during checkout in a face-to-face transaction the customer is typically required to provide some form of payment information such as credit card information for the selected items. As the customer continues shopping and is ready to purchase items from other merchant websites or from other merchants directly, the process of providing payment information such as credit card information to complete the purchase transaction is repeated.

In this regard, multiple funding instruments including credit cards such as merchant specific credit cards, as well as, credit cards to satisfy a variety of accounting purposes including one or more cards for business related purchases and one or more cards for personal related purchases may be carried by the customer. Accordingly, the necessity to retrieve a particular card is often cumbersome and inconvenient, while trying to remember and recall the sixteen-digit credit card number so that the card number and its associated credit card information may be verified and authorized is extremely difficult and more often than not results in an error in card authorization as the card numbers are not accurately recalled and communicated to the merchant system.

Accordingly, there exits a need for a passphrase account identifier for use as a funding instrument number substitute in a financial network.

SUMMARY

For purposes of summarizing the disclosure, exemplary embodiments of a system and method for facilitating a financial transaction over a network including a passphrase account identifier have been described herein.

In one embodiment, a system for facilitating a financial transaction over a network comprises a communication interface; and a payment provider system configured to receive via the communication interface a passphrase account identifier from a merchant system, match the passphrase account identifier to a corresponding funding instrument number of a corresponding funding instrument and associated funding instrument account, authorize the funding instrument, and indicate notification of one of acceptance of the funding instrument or decline of the funding instrument back to the merchant system.

In another embodiment, a system for facilitating a financial transaction over a network comprises a communication interface; and a payment provider system configured to receive via the communication interface a passphrase account identifier from a merchant system, match the passphrase account identifier to a corresponding funding instrument number of a corresponding funding instrument, communicated the corresponding funding instrument number to an issuer system, receive from the issuer system a notification indication of one of acceptance of the funding instrument or decline of the funding instrument, and communicate back to the merchant system the notification indication.

In still another embodiment, a method for facilitating a financial transaction over a network comprises receiving via the communication interface a passphrase account identifier from a merchant system; matching the passphrase account identifier to a corresponding funding instrument number of a corresponding funding instrument and associated funding instrument account; authorizing the funding instrument; and indicating notification of one of acceptance of the funding instrument or decline of the funding instrument back to the merchant system.

These and other embodiments will be more readily apparent from the detailed description of the embodiments set forth below taken in conjunction with the accompanying drawings.

Figure 1:
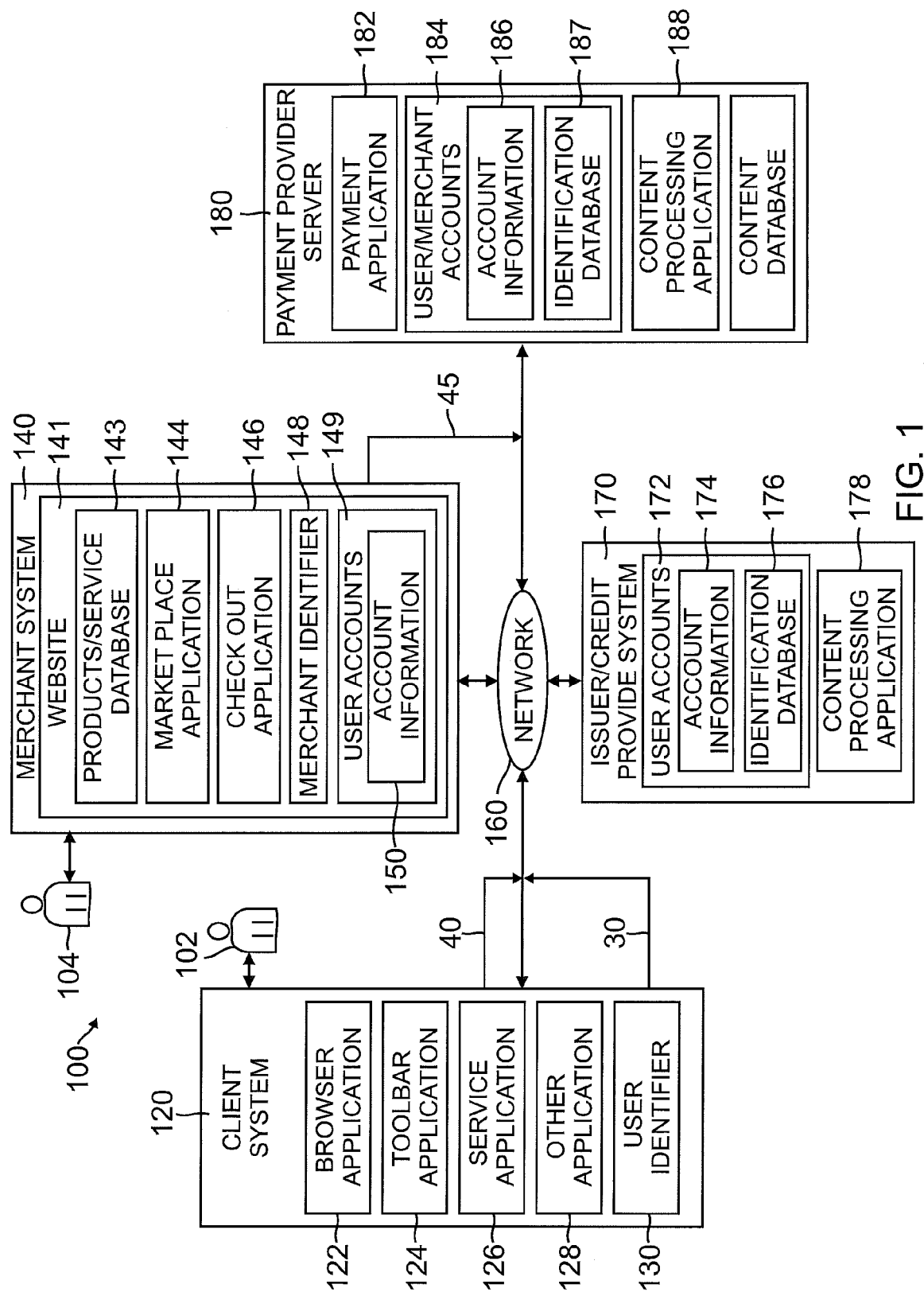
FIG. 1 shows a block diagram of a network system configured to facilitate online financial transactions.

Embodiments of the disclosure are understood by referring to the detailed description that follows. It should be appreciated that like reference numerals are used to identify like elements illustrated in one or more of the figures, wherein showings therein are for purposes of illustrating embodiments and not for purposes of limiting the same.

DETAILED DESCRIPTION

Exemplary embodiments will now be described with references to the accompanying figures, wherein like reference numbers refer to like elements throughout. The terminology used in the description presented herein is not intended to be interpreted in any limited or restrictive manner simply because it is being utilized in conjunction with a detailed description of certain embodiments.

Embodiments of the present disclosure are described herein as they may relate to an electronic payment system environment. An electronic payment system is generally considered as any kind of network service that includes the exchange of money for goods or services. Such network payment system includes, for example, card systems such as a credit and/or debit card processing system for facilitating an online or web-based financial transaction. However, persons of ordinary skill in the art will understand that the teachings of the present disclosure apply equally to a financial transaction that occurs directly between a buyer and a merchant such as in a face-to-face transaction that may occur in department store or similar type business environment.

In one embodiment, the network may be implemented as a single network or a combination of multiple networks. For example, in various embodiments, the network may include the Internet and/one or more intranets, landline networks, wireless networks, and/or other appropriate types of communication networks. In another example, the network may comprise a wireless telecommunications network (e.g., cellular phone network) adapted to communicate with other communication networks, such as the Internet.

As generally shown in FIG. 1, a network system such as a card system 100 may include a client system 120 (also referred to as a "user" system herein), a merchant system 140 having a merchant provided website 141 for the sale of goods and/or services, a payment provider system 180, and a card issuer system 170, wherein the flow of information and money between the parties in the financial transaction occurs along a network 160 such as the Internet.

Generally, in the card system 100, a user 102 (e.g., "buyer", "client", or "cardholder") is issued credit 30 after an account has been approved by an issuer system 170 such as a financial institution (bank) or other organization. The issuer system 170 registers the user 102, issues a card(s), and operates a card account 172 to which payments can be charged. The user 102 is able to make purchases with the card for products and/or services from a merchant system 140 accepting the card up to a pre-established credit limit.

For simplicity and ease of describing the subject matter, the description that follows uses a credit card system as an example of a network payment system in which use of passphrase account identifier as described herein may be applicable. Persons of ordinary skill in the art will understand that other network payment systems wherein a card having a number(s) as an identifying feature that is used for verification, authorization, and other purposes may be used within the scope of the disclosure.

In a typically financial transaction, the user 102 chooses one of multiple funding instruments 40, such as a credit card, to pay for the purchase of an item (product and/or service) and the merchant system 140 and submits the card number for authorization 45 either verbally or by locating and swiping the credit card at a point-of-sale device. The issuer system 170 may act directly with the merchant system 140 for credit card authorization. However, as there are many issuer systems, it is generally more efficient for a payment provider system 180 to provide card services to the merchant system 140. In this regard, the merchant system 140 establishes a connection with the payment provider system 180. Connections may be made through an application programming interface (API) for card verification and processing. The APIs are generally HTTP or TCP/IP based and provide a relatively simple interface to communicate with the merchant's application software.

In this regard, the payment provider system 180 may provide payment processing for online transactions on behalf of the user 102 so that the user 102 does not expose his payment information directly to the merchant system 140. Instead the user 102 registers his account information with the payment provider system 180, maps the account to an email address, and then uses the payment provider system 180 to make purchases when redirected to the payment provider system 180 from the merchant's site 141. After the transaction is authorized 45 the payment provider system 180 completes the online transaction, while the user 102 is directed back to the merchant's site 141 to an order confirmation page.

More specifically, the client system 120 may include one or more browser applications 122 which may be used, for example, to provide a user interface to permit the user 102 to browse information available over the network 160; one or more toolbar applications 124 displaying a graphical user interface (GUI) in connection with the browser application 122 to provide client-side processing for performing tasks in response to operations selected by the user 102; and a service application 126 comprising a software program for facilitating financial transactions, e.g., the direct purchase of items (products and/or services) on the network 160.

The service application 126 typically comprises a software program, such as the GUI, executable by a processor that is configured to interface and communicate with the one or more merchant systems 140 and the payment provider system 180 via the network 160. The service application 126 is configured to provide and display a payment mechanism, such an image or icon, on a display component (e.g., monitor) of the client system 120. The user 102 is able to access merchant websites 141 via merchant systems 140 to view and select items for purchase by communicating with the payment provider 180.

The client system 120 may include other applications 128 as may be desired in particular embodiments to provide additional features available to the user 102. For example, such other applications 128 may include security applications for implementing client-side security features, programmatic client applications for interfacing with appropriate application programming interfaces (APIs) over the network 160 or various other types of generally known programs and/or applications.

The client system 120 may include one or more user identifiers 130, which may be implemented, for example, as operating system registry entries, cookies associated with the browser application 122, identifiers associated with hardware of the client system 120, or various other appropriate identifiers. The user identifier 130 may include attributes related to the user, such as personal information and banking information including credit card number. In various implementations, the user identifier 130 may be passed with a user purchase request to the payment provider 180, and the user identifier 130 may be used by the payment provider 180 to associate the user 102 with a particular user account maintained by the payment provider 180.

Figure 2:
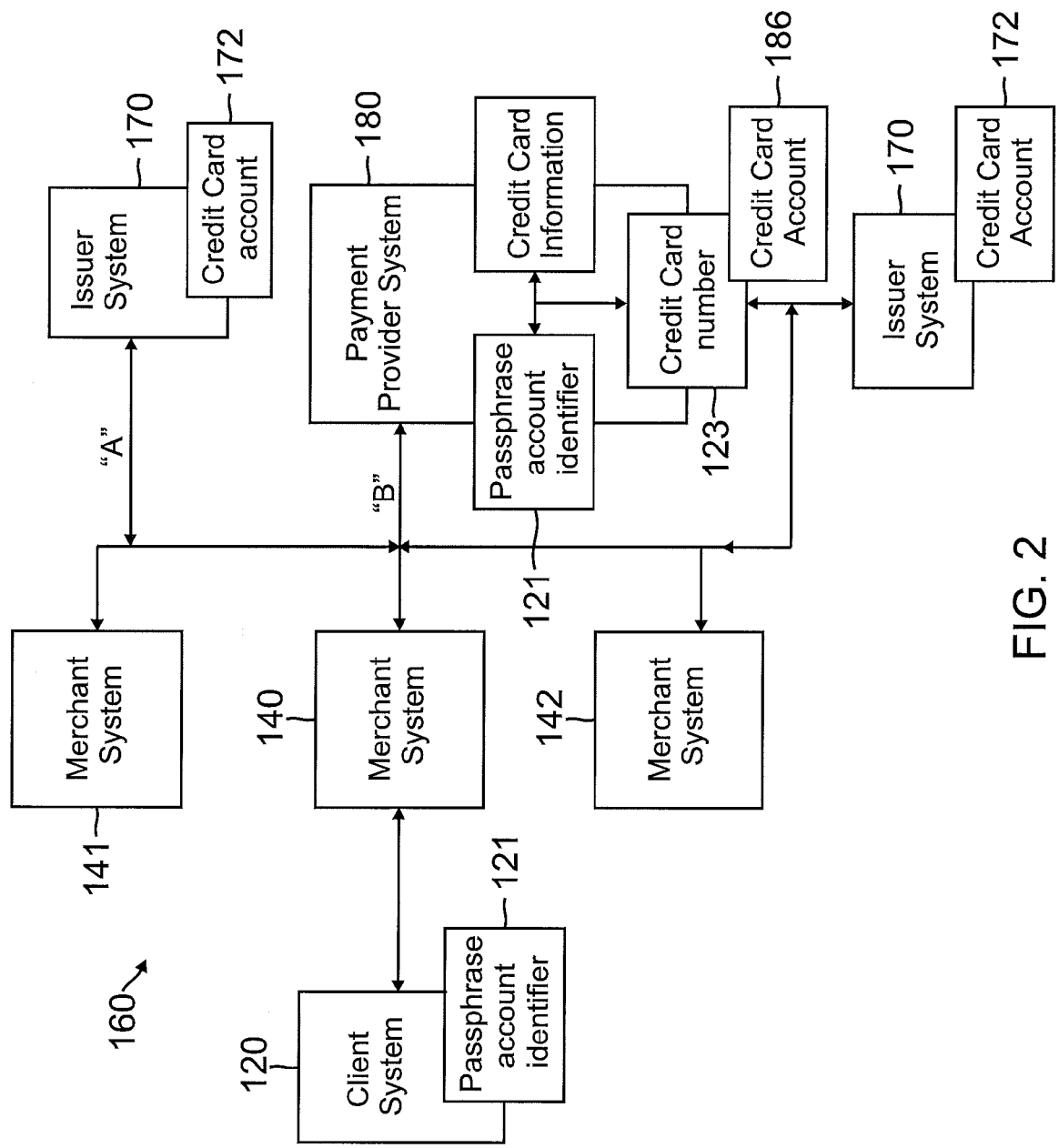
FIG. 2 shows a block diagram including a passphrase account identifier for use as a funding instrument number substitute in a network environment in accordance with one embodiment.

As shown in FIG. 1 and FIG. 2, one or more merchant systems 140-142 are maintained by merchants 104 offering various items (products and/or services) in exchange for financial payment or other consideration to be received from users, such as user 102, over the network 160. In this regard, each one of the one or more merchant systems 140-142 may include a database 143 for identifying available products and/or services, which may be made available to the client system 120 for viewing and purchase by the user 102. Accordingly, each of the merchant systems 140-142 may include a marketplace application 144 configured to provide information over the network 160 to the browser application 122 of the client system 120. For example, the user 102 may interact with the marketplace application 144 through the browser application 122 over the network 160 to search and view various items, products and/or services identified in the database 143.

Each of the one or more merchant systems 140-142 may include a checkout application 146 configured to accept payment information from the user 102 and/or from the payment provider system 180 over the network 160 to facilitate online transactions of products and/or services identified by the marketplace application 144.

Each of the one or more merchant systems 140 may include one or more merchant identifiers 148, which may be included as part of the one or more items made available for purchase so that a particular item may be associated with a particular merchant 104. The merchant identifier 148 may include attributes related to the merchant 104, such as business and banking information. In various implementations, the merchant identifier 148 may be passed with a user purchase request to the payment provider system 180 when the user 102 selects a item for purchase and processing, and the merchant identifier 148 may be used by the payment provider system 180 to associate a particular item purchased with a particular merchant account maintained by the payment provider system 180.

Each of the one or more merchants 104 having a related merchant system 140-142 may need to establish a merchant account 184 with the payment provider system 180 so that the payment provider system 180 is able to process transactions having items offered for purchase by the merchants 104. When establishing a merchant account 184, each of the one or more merchants 104 may need to provide business information, such as name, address, phone number, etc., and financial information, such as banking information, merchant account information, credit card information, payment processing information, etc.

Each of the one or more merchant systems 140-142 may be associated with a particular link (e.g., a link, such as a URL (Uniform Resource Locator) to an IP (Internet Protocol) address). In this regard, the payment provider system 180 may optionally redirect the browser application 122 to an appropriate webpage and/or merchant site 141 of the merchant system 140 to facilitate purchase of a corresponding item made available from at least one of the merchant systems 140.

Each one of the merchant systems 140-142 may further be configured to include and maintain a plurality of user accounts 149, each of which may include account information 150 associated with individual users. For example, account information 150 may include private financial information of user 102, such as one or more account numbers, passwords, credit card information, banking information, or other types of financial information, which may be used to facilitate online transactions between the user 102 of the client system 120 and one or more merchants systems 140-142. In various embodiments, the methods and systems described herein may be modified to accommodate users that may or may not be associated with at least one existing user account and/or merchant account, respectively.

Alternatively, as indicated above, the payment provider system 180 may provide payment processing for online transactions on behalf of the user 102 to an operator of the merchant system 140. In this regard, the payment provider system 180 includes one or more payment applications 182, which may be configured to interact with the client device 120 and/or each of the merchant systems 140-142 over the network 160 to facilitate the purchase of items by the user 102 from the merchant systems 140-142.

The payment provider system 180 may be configured to maintain a plurality of user and merchant accounts 184, each of which may include account information 186 associated with individual users 102 and the one or more merchants 104 associated with the merchant systems 140-142. For example, account information 186 may include private financial information of user 102 and/or merchants 104, such as one or more account numbers, passwords, credit card information, banking information, or other types of financial information, which may be used to facilitate online transactions between the user 102 of the client system 120 and one or more merchants 104 associated with the merchant systems 140-142. As such, the payment application 182 may be configured to interact with the one or more merchant systems 140-142 on behalf of the user 102 during a transaction with checkout application 146 without requiring the user 102 to provide account information 186 directly to the merchant systems 140-142. In various embodiments, the methods and systems described herein may be modified to accommodate users and/or merchants that may or may not be associated with at least one existing user account and/or merchant account, respectively.

As shown in FIG. 1, in one method for conducting a client-side online transaction the service application 126 may be installed and run on the client system 120 to allow the client system 120 to communicate with one or more of the merchant systems 140-142 via the network 160 to select an item for purchase.

Likewise, the service application 126 allows the client system 120 to further communicate with the payment provider system 180 to process online purchase requests for items selected for purchase and processing in a financial transaction.

As indicated above, the user 102 may run the browser application 122 on the client system 120 to access at least one merchant website 141 via a related merchant system 140 to search the accessed merchant website 141 and view one or more items for purchase.

The user 102 may, for example, generate a purchase request for an item at the merchant's site 141. The purchase request may include user information, merchant information, and selected item information embedded as arguments in an expression that are passed to the payment provider system 180. The user information may include user identifier information, the merchant information may include the merchant identifier information, and the selected item information may include one or more image attributes, including item identifier information, having dynamic arguments identifying the item and the merchant providing the item.

The payment provider system 180 receives the purchase request including credit card data from the user 102 via the client system 120. Next, the payment provider system 180 verifies the user account information including user identification provided by the user 102 in the purchase request with user information stored in payment provider system 180.

In this regard, the payment provider system 180 validates the card and communicates with the issuer system 170 to verify the amount for the transaction is available in the customer's account 174. Alternatively, as indicated above, the merchant system 140 may communicate with the issuer system 170 to obtain credit card authorization. In either case, if the card is good and the funds are available, an approved notification indication or message is sent back to the merchant system 140. If the card is bad or if funds are not available, a declined notification indication or message is sent back to the merchant system 140.

Once proper user identification has been provided and/or verified, and the funding instrument has been authorized the online purchase may be completed by deducting the amount of the purchase request from the user account and crediting the amount of the purchase request to the merchant account.

As indicated above, in many financial transactions online or face-to-face, such as those that typically occur when a merchant manages a cash register and/or a point-of-sale (POS) system, a user attempting to purchase an item may be carrying multiple funding instruments including credit cards such as merchant specific credit cards, as well as, credit cards to satisfy a variety of accounting purposes including one or more cards for business related purchases and one or more cards for personal related purchases. Accordingly, the necessity to retrieve the card is often cumbersome and inconvenient, while trying to remember and recall the sixteen-digit credit card number so that the credit card account may be verified and authorized is extremely difficult and more often than not results in an error in card authorization as the card numbers are not accurately recalled and communicated to the merchant system.

Embodiments of the disclosure overcome the above-mentioned difficulties of retrieving a credit card or remembering a credit card number by providing a passphrase account identifier as an easily remembered substitute for the sixteen digit credit card number to enable users to conduct a payment transaction in a more efficient manner. Accordingly, subject matter described herein permits a user to dispense with carrying payment cards and the above-mentioned problems generally associated with the cards by essentially providing a "cardless wallet".

As indicated above, in order to obtain credit, i.e., receive credit approval and establish a credit card account 172 with the issuer system 170 and/or establish a user account 184 with the payment provider system 180, the user 102 is typically required to provide private financial information such as one or more account numbers, passwords, other credit card information, banking information, or other types of financial information, as well as, personal information such as name, age, residence location, etc. which may be stored in the corresponding identification database 176, 187 and used to facilitate online transactions.

In accordance with one embodiment, during the process of establishing various credit card or similar type of funding instrument accounts with either the payment provider system 180 and/or the issuer system 170 the user 102 is prompted to provide a passphrase account identifier 121 as a relatively more easily remembered substitute for the sixteen digit credit card number 123 to enable users to conduct a payment transaction in more efficient manner.

For example, when establishing a Visa® account with the issuer system 170, the user may indicate that the passphrase "BigSpender", "4121979" (indicating an easily remembered date), or any alpha-numerical combination that is not less than a specified minimum number of characters and not greater than specified maximum number of characters is to be used in place of the actual credit card number 123 when completing a purchase or other type of transaction that requires credit card information to be provided by the user. For at least transaction and identification purposes, the passphrase is essentially an identifier used by the payment provider system 180 and/or issuer system 170 to identify the user's credit card number 123. In a similar manner, a passphrase account identifier 121 may be assigned or designated by the user 102 for each credit card number. Accordingly, instead of attempting to recall or remember the sixteen digits of one or more credit cards, the user 102 is only required to recall or remember a relatively simple and more familiar/personal passphrase account identifier 121.

FIG. 2 shows a block diagram of a passphrase account identifier for use in a network environment in accordance with one embodiment. In an online financial transaction, as indicated above, one or more browser applications 122 may be used to provide a user interface to permit the user 102 to browse information available over the network 160; one or more toolbar applications 124 displaying a graphical user interface (GUI) in connection with the browser application 122 to provide client-side processing for performing tasks in response to operations selected by the user 102; and a service application 126 comprising a software program for facilitating the financial transactions, e.g., the direct purchase of items (products and/or services) on the network 160.

At the time of online checkout, i.e., purchase of item, verification and authorization of credit, etc., the user 102, in lieu of the credit card number 123, provides the merchant system 140 with the passphrase account identifier 121 chosen by the user 102 to represent the credit card number 123 corresponding to a particular credit card account.

Once received by merchant system 140, the passphrase account identifier 121 may be communicated, as indicated by reference "A", via the network 160 to the issuer system 170 where the passphrase account identifier 121 is matched to user information including the corresponding credit card number 123 and the associated credit card account 172. In one embodiment, as encryption and decryption techniques and/or technology is not required, the process of matching passphrase account identifier 121 to the corresponding credit card number 123 and its associated account 172 is not unlike matching of any other data related to the user 102 and various account information. Once the credit card number 123 is retrieved, the associated credit card account 172 may be verified and authorized for acceptance or decline by the issuer system 170; the result of which are then communicated back to the merchant system 140 so that the purchase transaction may be completed.

Likewise, persons of ordinary skill in the art will understand that the payment provider system 180 may maintain various credit accounts 186 such that once the passphrase account identifier 121 is received by the payment provider system 140 via the network 160 the passphrase account identifier 121 may be matched to a corresponding credit card number 123 and its associated credit account 186 to facilitate acceptance or decline of the credit transaction by the payment provider system 140.

In an alternative embodiment shown in FIG. 2, the user 102 proceeds to online checkout, i.e., purchase of item, verification and authorization of credit, etc., where once again the user 102, in lieu of the credit card number, provides the merchant system 140 with the passphrase account identifier 121 chosen by the user 102 to represent a credit card number 123 corresponding to a particular credit card account.

Once received by merchant system 140, the passphrase account identifier 121 may be communicated, as indicated by reference "B", via the network 160 to the payment provider system 180 where the passphrase account identifier 121 is matched to user information including the corresponding credit card number 123. In one embodiment, once again, as encryption and decryption techniques and/or technology is not required, the process of matching passphrase account identifier 121 to the corresponding credit card number 123 is not unlike matching of any other data related to the user 102 and various account information. Once obtained by the payment provider system 180, the credit card number 123 may then be communicated along various network pathways to facilitate completion of the purchase transaction.

Figure 3:
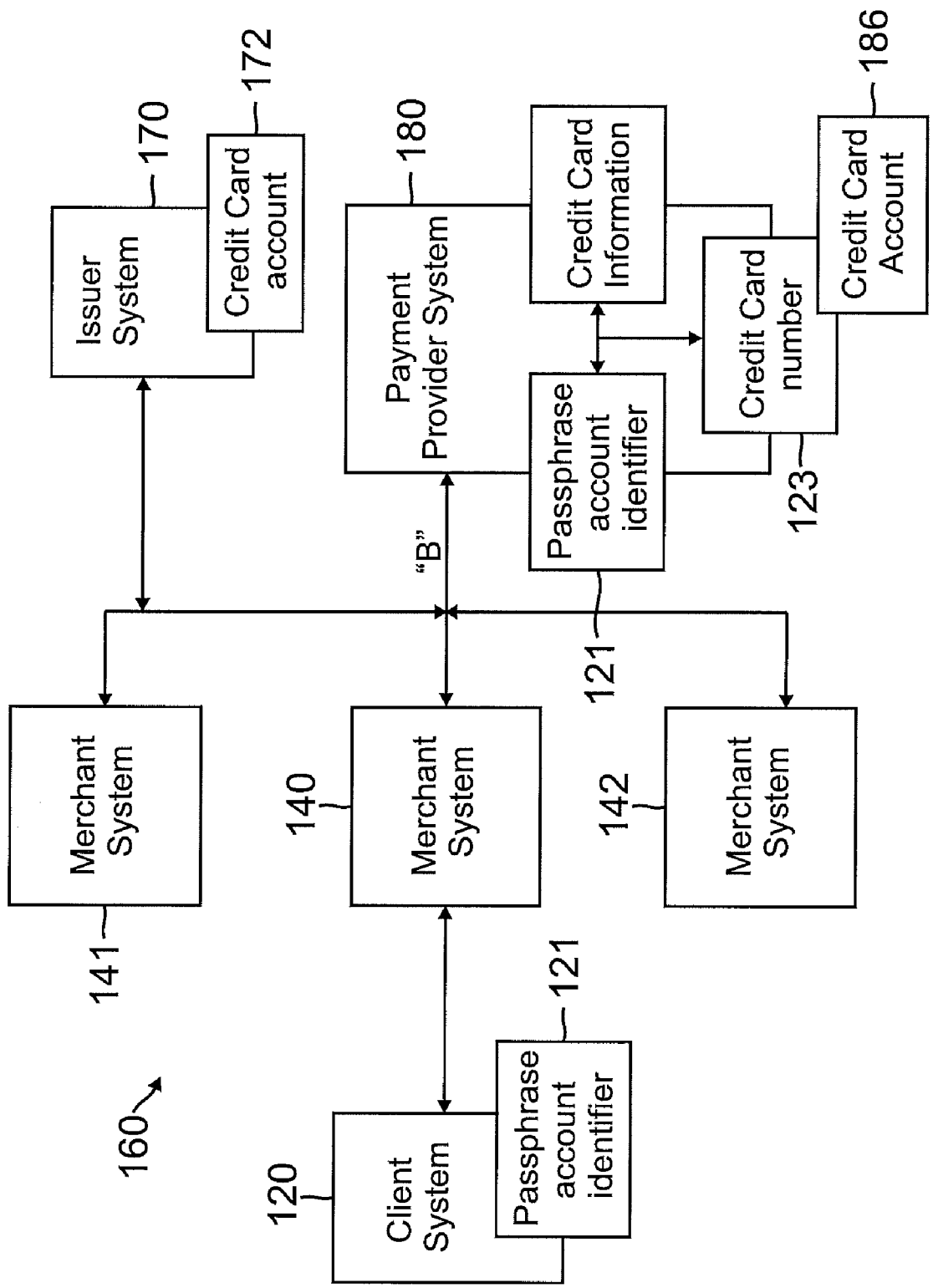
FIG. 3 shows a block diagram including a passphrase account identifier for use as a funding instrument number substitute in a network environment in accordance with another embodiment.

In this regard, as shown in FIG. 3, the credit card number 123 may be communicated from the payment provider system 180 back to the merchant system 140 via the network 160. The merchant system 140 then communicates the credit card number 123 via the network 160 to the issuer system 170 where the credit card number 123 is matched to the associated credit card account 172 to permit verification and authorization (acceptance or decline) of the credit card. Acceptance or decline notification of the credit card is then communicated back to the merchant system 140 via the network 160 to facilitate completion of the purchase transaction.

Figure 4:
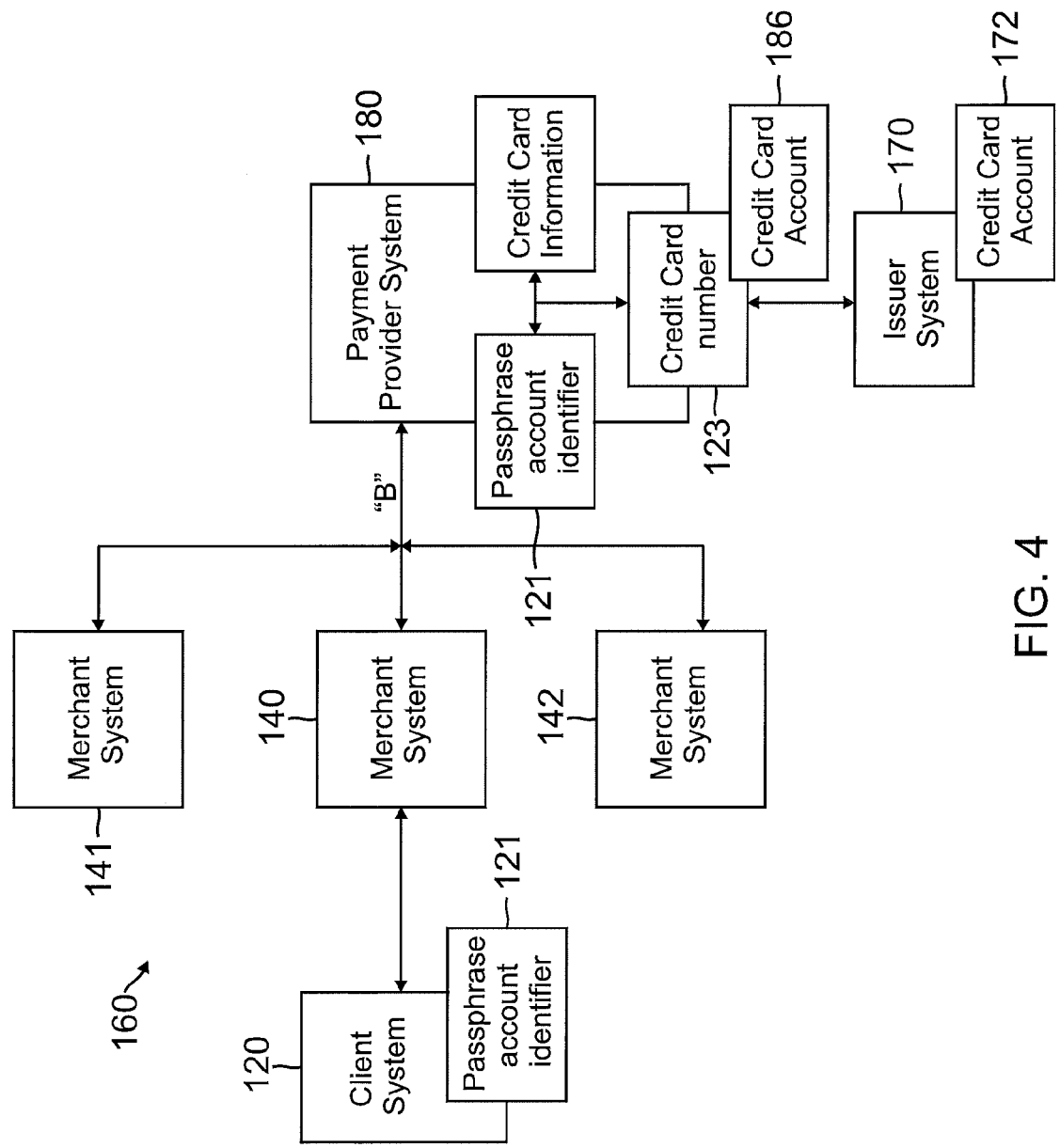
FIG. 4 shows a block diagram including a passphrase account identifier for use as a funding instrument number substitute in a network environment in accordance with still another embodiment.

Alternatively, as shown in FIG. 4, the credit card number 123 is communicated from the payment provider system 180 to the issuer system 170 via the network 160 where the credit card number 123 is matched to the associated credit card account 172 to permit verification and authorization (acceptance or decline) of the credit card. Acceptance or decline notification of the credit card is then communicated back to the payment provider system 180 via the network 160 where the notification is further communicated from the payment provider system 180 to the merchant system 140 to facilitate completion of the purchase transaction.

Figure 5:
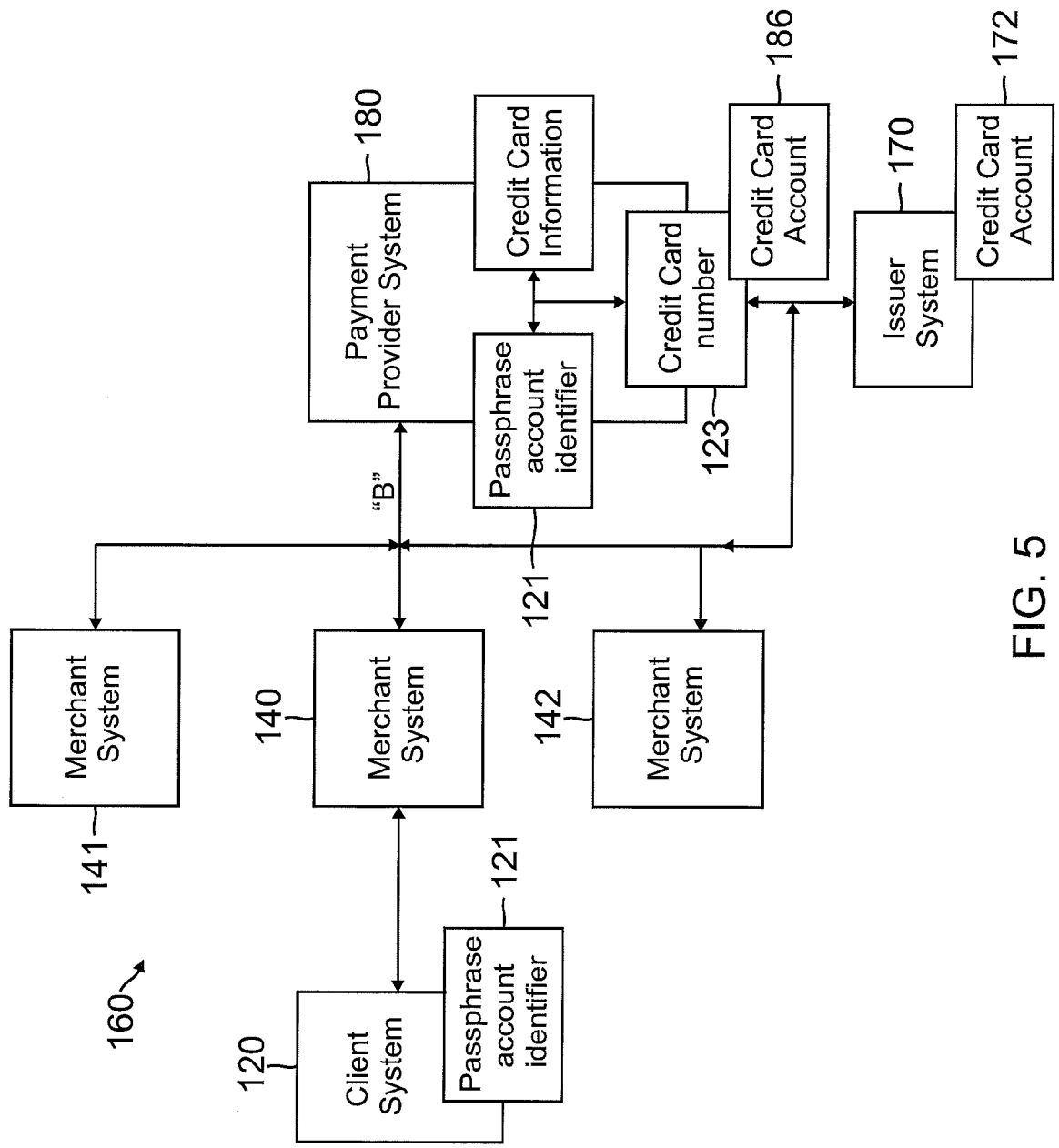
FIG. 5 shows a block diagram including a passphrase account identifier for use as a funding instrument number substitute in a network environment in accordance with another embodiment.

In still another network scheme, as shown in FIG. 5, the credit card number 123 is communicated from the payment provider system 180 to the issuer system 170 via the network 160 where the credit card number 123 is matched to the associated credit card account 172 to permit verification and authorization (acceptance or decline) of the credit card. Acceptance or decline notification of the credit card is then communicated back from the issuer system 170 via the network 160 to the merchant system 140 to facilitate completion of the purchase transaction.

Figure 6:
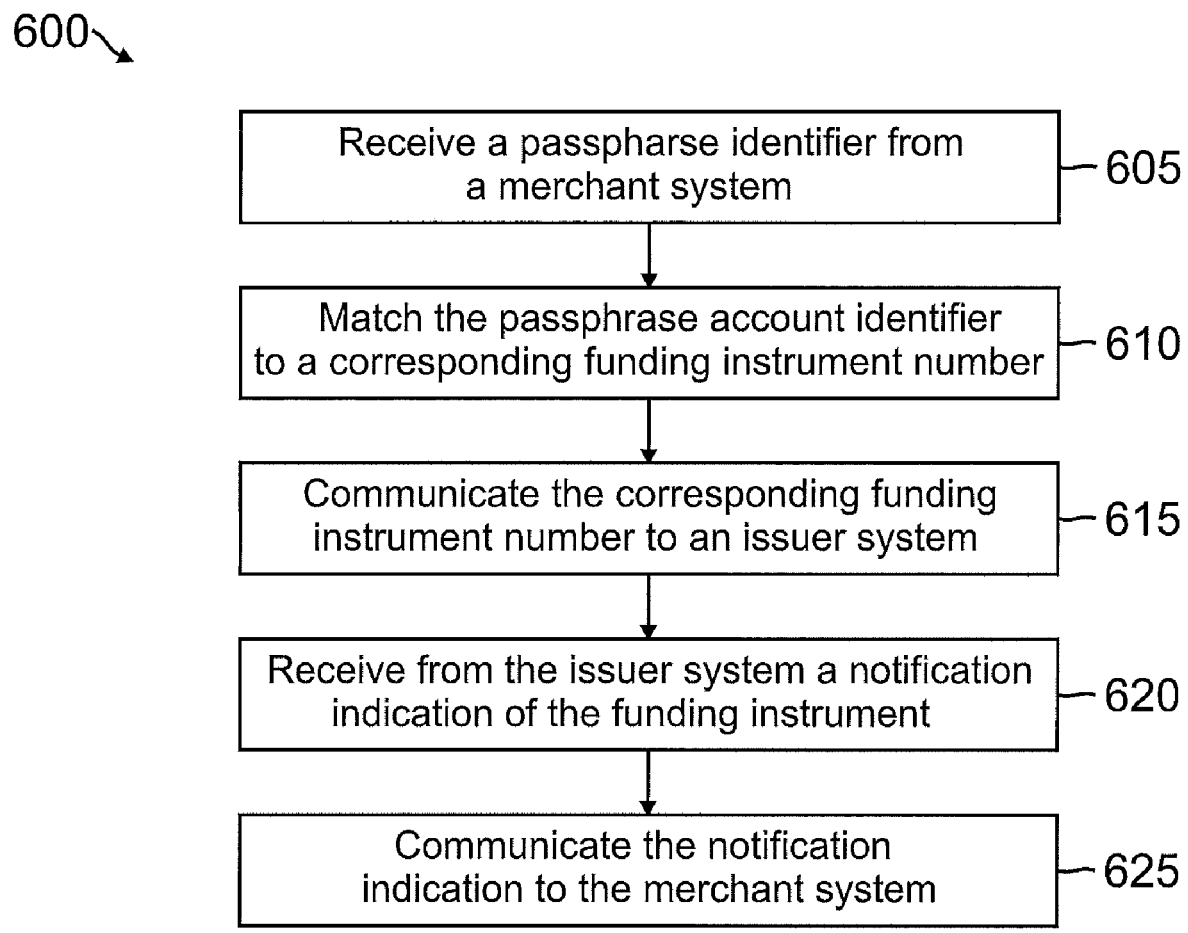
FIG. 6 shows one embodiment of a method for facilitating a financial transaction over a network including a passphrase account identifier in reference to a payment provider system.

FIG. 6, shows one embodiment of a method 600 for facilitating a financial transaction over a network including a passphrase account identifier in reference to a payment provider system. In this regard, upon user instruction, the service application 126 may be installed and/or run on the client device 120 to access at least one merchant website 141 via a related merchant system 140 to search the accessed merchant website 141 and view one or more items for purchase.

Next, the user 102 may generate a purchase request for at least one item by selecting the at least one item from the merchant's site 141 and proceed to checkout. Methods of item selection (product and/or service) and communication of the purchase request including user information, merchant information, and selected item information to the payment provider system 180 for payment processing is generally well-known in the art.

Upon selection of one or more funding instruments for the purchase of the at least one item, the user 102 is further prompted to provide to the merchant system 140 a passphrase account identifier 121 as a relatively more easily remembered substitute for the sixteen digit credit card number 123 to enable users to conduct a payment transaction in more efficient manner.

Once received by merchant system 140, the passphrase account identifier 121 may be communicated and received, via the network 160 by the payment provider system 180 (block 605) where the passphrase account identifier 121 is matched to user information including the corresponding credit card number 123 (block 610). In this regard, as encryption and decryption techniques and/or technology is not required, the process of matching passphrase account identifier 121 to the corresponding credit card number 123 is not unlike matching of any other data related to the user 102 and various account information.

Next, the credit card number 123 is communicated from the payment provider system 180 to the issuer system 170 via the network 160 (block 615) where the credit card number 123 is matched to the associated credit card account 172 to permit verification and authorization (acceptance or decline) of the credit card. Acceptance or decline notification of the credit card is then communicated back and received by the payment provider system 180 via the network 160 (block 620) where the notification is further communicated from the payment provider system 180 to the merchant system 140 (block 625) to facilitate completion of the purchase transaction.

Although described in various embodiments as not requiring the use of encryption/decryption techniques and technologies, persons of ordinary skill in the art will understand that in alternative embodiments all or any part of the payment network pathways described herein may employ the use of cryptosystems, i.e., public and private key technology, including the use of Secure Sockets Layers protocol and/or Secure HTTP (S-HTTP) protocol for transmitting information such as payment card numbers and the like over public networks such as the Internet between individuals, systems, etc., may be utilized without departing from the spirit of the disclosed subject matter.

In accordance with various embodiments of the invention, a computer device or system, such as systems 120, 140, 170 and 180 described herein and which may further include a personal computer and/or a network server, includes a bus or other communication mechanism for communicating information, which interconnects subsystems and components, such a as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard), and cursor control component (e.g., mouse or trackball). In one implementation, disk drive component may comprise a database having one or more disk drive components.

In accordance with embodiments of the invention, the computer system performs specific operations by a processor executing one or more sequences of one or more instructions contained in a system memory component. Such instructions may be read into system the memory component from another computer readable medium, such as a static storage component or a disk drive component. In other embodiments, hard-wired circuitry may be used in place of or in combination with software instructions to implement the subject matter disclosed herein.

Logic may be encoded in a computer readable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments, execution of instruction sequences to practice the invention may be performed by computer system. In various other embodiments of the invention, a plurality of computer systems coupled by communication link (e.g., network 160 of FIG. 1, LAN, WLAN, PTSN, or various other wired or wireless networks) may perform instruction sequences to practice embodiments in coordination with one another.

The computer system may transmit and receive messages, data, information and instructions, including one or more programs (i.e., application code) through a communication link and a communication interface. Received program code may be executed by the processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Although the method(s)/step(s) are illustrated and described herein as occurring in a certain order, the specific order, or any combination or interpretation of the order, is not required. Obvious modifications will make themselves apparent to those of ordinary skill in the art, all of which will not depart from the essence of disclosed subject matter, and all such changes and modifications are intended to be encompassed within the appended claims.

What is claimed is:

1. A payment provider system configured to receive over a financial network a passphrase account identifier from a merchant system, wherein the passphrase account identifier is provided by a consumer, match the passphrase account identifier to a corresponding funding instrument number of the consumer stored in a database maintained by the payment provider system, communicate the corresponding funding instrument number corresponding to a funding instrument of the consumer to a credit issuer system, receive from the credit issuer system a notification indication of one of acceptance of the funding instrument or decline of the funding instrument, and communicate back to the merchant system the notification indication.

2. The system of claim 1, wherein the passphrase account identifier is an alpha-numerical combination having a predetermined character length.

3. The system of claim 1, wherein the funding instrument is a credit card.

4. A credit issuer system configured to receive over a financial network a passphrase account identifier from a payment provider system via a merchant system, wherein the passphrase account identifier is provided by a consumer, receive from the payment provider system a funding instrument number corresponding to the passphrase account identifier, match the funding instrument number corresponding to the passphrase account identifier to a corresponding funding instrument number of the consumer stored in a database maintained by the credit issuer system, authorize the funding instrument, and communicate a notification indication of one of acceptance of the funding instrument or decline of the funding instrument to the payment provider system.

5. A payment provider system configured to receive over a financial network a passphrase account identifier from a merchant system, wherein the passphrase account identifier is provided by a consumer, match the passphrase account identifier to a corresponding funding instrument number of the consumer stored in a database maintained by the payment provider system, and communicate the corresponding funding instrument number corresponding to a funding instrument of the consumer to a credit issuer system for authorization by the credit issuer system.

6. The system of claim 5, wherein the passphrase account identifier is an alpha-numerical combination having a predetermined character length.

7. The system of claim 5, wherein the funding instrument is a credit card.

8. The system of claim 4, wherein the passphrase account identifier is an alpha-numeric combination unique to an account number of the funding instrument.

9. The system of claim 4, wherein the funding instrument is a credit card.

* * * * *